US012747110B2

(12) United States Patent
Mahringer

(10) Patent No.: US 12,747,110 B2
(45) Date of Patent: Sep. 29, 2026

(54) SYSTEM AND METHOD FOR DETECTING A NUMBER OF GOODS IN A LOAD CARRIER

(71) Applicant: TGW Logistics GmbH, Marchtrenk (AT)

(72) Inventor: Thomas Mahringer, Pucking (AT)

(73) Assignee: TGW Logistics GmbH, Marchtrenk (AT)

(*) Notice: Subject to any disclaimer, the term of this patent is extended or adjusted under 35 U.S.C. 154(b) by 754 days.

(21) Appl. No.: 18/017,537

(22) PCT Filed: Jul. 26, 2021

(86) PCT No.: PCT/AT2021/060259
§ 371 (c)(1),
(2) Date: Jan. 23, 2023

(87) PCT Pub. No.: WO2022/020870
PCT Pub. Date: Feb. 3, 2022

(65) Prior Publication Data

US 2023/0264901 A1 Aug. 24, 2023

(30) Foreign Application Priority Data

Jul. 27, 2020 (AT) .............................. A 50639/2020

(51) Int. Cl.
*B65G 43/08* (2006.01)
*G06M 7/00* (2006.01)

(52) U.S. Cl.
CPC ............... *B65G 43/08* (2013.01); *G06M 7/00* (2013.01); *B65G 2203/0241* (2013.01); *B65G 2203/0258* (2013.01); *B65G 2203/041* (2013.01)

(58) Field of Classification Search
CPC ............ B65G 43/08; B65G 2203/0241; B65G 2203/0258; B65G 2203/041; G06M 7/00; G06Q 10/087; B65B 65/08; B07C 5/3422
See application file for complete search history.

(56) References Cited

U.S. PATENT DOCUMENTS 5,546,475 A 8/1996 Bolle et al.
9,897,720 B2 * 2/2018 Faber .................. G01B 11/245
10,339,656 B1 * 7/2019 Le ............................ G06T 7/50
(Continued)

FOREIGN PATENT DOCUMENTS

CA 3093312 A1 9/2019
CN 110261401 A 9/2019
(Continued)

OTHER PUBLICATIONS

International Search Report in PCT/AT2021/060259, mailed Oct. 19, 2021.

*Primary Examiner* — Patrick H Mackey
(74) *Attorney, Agent, or Firm* — Collard & Roe, P.C.

(57) ABSTRACT

In a system and a method for detecting a number of articles in a placement region of a load carrier in a warehouse, the load carrier is provisioned in an analysis region, and an image of the placement region of the load carrier is captured by an image capturing system and transmitted to a data processing unit, whereupon the image is evaluated by an algorithm for object recognition, in order to recognize the articles arranged in the placement region of the load carrier as objects and to ascertain the number of articles in the placement region of the load carrier.

21 Claims, 6 Drawing Sheets

(56) References Cited

U.S. PATENT DOCUMENTS

| | | | |
|---|---|---|---|
| 10,586,208 | B2 * | 3/2020 | Buibas ...................... G06T 7/74 |
| 11,084,657 | B2 | 8/2021 | Herzog-Lang et al. |
| 11,559,899 | B2 * | 1/2023 | Beinhofer ............ B25J 15/0441 |
| 2012/0307072 | A1 | 12/2012 | Folk |
| 2017/0136632 | A1 | 5/2017 | Wagner et al. |
| 2019/0329410 | A1 | 10/2019 | Wagner et al. |
| 2020/0065747 | A1 * | 2/2020 | Elazary .............. G06K 7/10128 |
| 2020/0134828 | A1 | 4/2020 | Diankov et al. |
| 2020/0218865 | A1 | 7/2020 | Wagner et al. |
| 2020/0410435 | A1 * | 12/2020 | Ketterer .................. B65B 57/18 |
| 2021/0024298 | A1 | 1/2021 | Doppler et al. |

FOREIGN PATENT DOCUMENTS

| | | | |
|---|---|---|---|
| DE | 10 2010 001569 | A1 | 8/2011 |
| DE | 10 2010 034176 | A1 | 2/2012 |
| DE | 10 2018 203645 | A1 | 9/2019 |
| EP | 0 685 814 | A2 | 12/1995 |
| WO | 2018/130712 | A2 | 7/2018 |

* cited by examiner

SYSTEM AND METHOD FOR DETECTING A NUMBER OF GOODS IN A LOAD CARRIER

CROSS REFERENCE TO RELATED APPLICATIONS

This application is the National Stage of PCT/AT2021/060259 filed on Jul. 26, 2021, which claims priority under 35 U.S.C. § 119 of Austrian Application No. A 50639/2020 filed on Jul. 27, 2020, the disclosure of which is incorporated by reference. The international application under PCT article 21(2) was not published in English.

BACKGROUND OF THE INVENTION

1. Field of the Invention

The invention relates to a system for detecting a number of articles in a placement region of a load carrier in a warehouse, comprising an analysis region, in which the load carrier can be provisioned, an image capturing system for monitoring the analysis region, and a data processing unit, wherein the image capturing system is configured to capture an image of the placement region of the load carrier and to transmit said image to the data processing unit.

Furthermore, the invention relates to a data center for managing data sets.

Additionally, the invention relates to a warehouse system comprising a plurality of load carriers, each of which has a placement region, a conveying device for transporting the load carrier, and a system for detecting a number of articles in the placement region of one of the load carriers.

Lastly, the invention relates to a method for detecting a number of articles in a placement region of a load carrier in a warehouse, wherein the load carrier is provisioned in an analysis region, wherein an image of the placement region of the load carrier is captured and transmitted to a data processing unit using the image capturing system.

2. Description of the Related Art

In the context of operating a warehouse, it is required to ascertain a number of articles or a fill level inside a load carrier, for example in order to take inventory or to check a picking order. In order to estimate a number of articles, usually devices are used, by means of which said number is approximately calculated from a total weight of the load carrier or, in the case of stackable articles, from a stack height. However, on the one hand, this is possible only for load carriers containing articles of just one type. On the other hand, such a weight-based ascertainment of the number of articles can only be performed for articles with a great individual weight. That is why this method is not suitable particularly for small articles, such as electronic components or screws. Small articles, in particular electronic components such as capacitors and the like are often individually wrapped in protective packaging, which is heavy compared to the individual weight of the small article. Accordingly, great fluctuations in the weight of the small articles along with the protective packaging may occur, which is why an estimation of the number of articles based on the total weight is impossible and/or not reliable. Moreover, devices are used, in which a fill height is captured optically in order to make a statement regarding the fill level. In order to obtain an exact number of articles, the articles are usually counted manually by a person.

The term article data comprises, among other things, a self-weight, a dimension, such as particularly a height, a shape, a color of the article, and the like. The general term load carrier is understood to mean, among other things, containers, cartons, trays, and the like. Such load carriers comprise a bottom shelf, side walls rising up from it and a loading opening bounded by the side walls. The bottom shelf forms a placement surface, on which the articles are placed. Load carriers may be loaded with articles of just one type, i.e. with a plurality of articles of the same article type (sort), or mixed, i.e. with a plurality of articles of different article types (sorts).

DE 10 2010 001 569 A1 discloses a system for picking pharmacy articles, wherein the articles are stacked by type in a filling shaft. A camera is used to capture the fill height. The number of articles in the filling shaft is calculated on the basis of the fill height and a known height of the individual article.

DE 10 2018 203 645 A1 describes a method for monitoring a picking operation, wherein a first and second camera system are provided, by means of which first, an identification code of an article is detected, and after the article is placed in a load carrier, an image of the article is captured from a bird's-eye perspective and a depth measurement is performed.

The disadvantage of such systems is that, on the one hand, either the identity of the individual articles must be known in order to successively detect them, or that, on the other hand, the load carrier must loaded with articles of just one type. load carrier with an integrated camera system is known from DE 10 2010 034 176 A1. On the basis of different brightness and color values inside the load carrier, the fill height is ascertained. Here, a separate camera system is required for each load carrier.

SUMMARY OF THE INVENTION

The object of the invention is to provide an improved system for ascertaining the number of articles.

A further object of the invention is to provide a data center for managing data sets, with which the system for detecting the number of articles can be optimized.

Furthermore, the object of the invention is to indicate a warehouse system with a system according to the invention.

Moreover, the object of the invention is to indicate an improved method for ascertaining the number of articles.

The first object is achieved according to the invention in that, in a system of the initially mentioned type, the data processing unit is configured to evaluate an image transmitted by the image capturing system using an algorithm for object recognition, in order to recognize the articles arranged in the placement region of the load carrier as objects and to ascertain the number of articles in the placement region of the load carrier.

An advantage of the invention is evident particularly in that individual articles in the placement region of the load carrier are recognized and automatically counted, regardless of their arrangement, orientation, dimensions and/or article type. Thus, an ascertainment of the number of articles is made possible both in a load carrier with articles of just one type and in a load carrier with a mixed load. Moreover, an ascertainment of the number of articles in a load carrier, which is loaded with lightweight articles, for example small articles such as electronic components or screws, is also made possible. Furthermore, the articles may be arranged in a disorganized manner and/or randomly in the placement region of the load carrier, in particular in one layer or two layers.

For this purpose, at least one image of the placement region of the load carrier is captured in order to represent the articles arranged in the placement region. The image is subsequently evaluated using the data processing unit using object recognition, wherein the number of articles is ascertained by the individual articles being recognized as objects. If no objects are recognized in the placement region, this corresponds to a number of articles of zero and/or an unloaded load carrier.

A single-layer or double-layer arrangement of the articles in the placement region is particularly advantageous as a number of images for the object recognition can be reduced, especially since all articles arranged in the placement region can be represented with a reduced number of images, in particular with one image from one perspective. Thus, a total number of articles of all articles arranged in the placement region can be ascertained.

With the system according to the invention, the number of articles at the article issue and/or at the article receipt can be detected in an automated manner. Moreover, an automatic inventory can be realized.

Furthermore, in the case of load carriers loaded with articles in multiple layers, the system also allows ascertaining a number of articles, which may correspond to a partial number of articles. Here, the number of articles (partial number of articles) comprises those articles which are not entirely covered by articles positioned on top and can thus be represented by the image capturing system. These are, in the case of multiple, in particular at least two or three, layers of articles, those articles which are arranged in a topmost layer or in the upper layers and are not entirely covered by articles on top.

Thus, with a first system, a first number of articles (first partial number of articles) before a working area, in particular a picking station or a filling station, can be determined, and with a second system, a second number of articles (second partial number of articles) after the working area can be ascertained. A difference between the first number of articles (first partial number of articles) and the second number of articles (second partial number of articles) corresponds, in this case, to a number of articles removed from the load carrier and/or articles placed in the load carrier.

The analysis region of the system is essentially that region in which the load carrier is provisioned for detecting the number of articles, and which is visible to the image capturing system and/or can be represented by the same.

Individual articles are recognized by the data processing unit as objects and/or individual items, independently from their article type (sort). It is not necessarily required that the articles are identified. Within the meaning of the invention, a recognition of the articles thus comprises at least the detection of individual articles as objects and/or individual items. An identification of the articles comprises, in addition to the recognition, an assignment of the articles to an article type (sort).

Preferably, the load carrier (container, tray, carton) has a bottom shelf, side walls rising up from it and at least a loading opening bounded by the side walls. The load carrier may also have multiple receiving compartments separated from one another by the side walls, wherein then, multiple loading openings are present, as well. Such a load carrier is formed, for example by a container with subdivided compartments. The bottom shelf forms a placement surface. The bottom shelf may also be formed by a base wall or a base grate. The placement region is bounded downwardly by the placement surface and laterally by the side walls. Thus, the placement region constitutes a volume, whose base area is formed by the placement region. It should also be noted that the load carrier may also comprise only the bottom shelf, but no side walls and consequently no loading opening. In this case, the placement region is defined solely by the placement surface.

Generally, the load carrier may also be formed by a hanging bag, as it is described in WO 2018/130712 A2, for example. The placement region is bounded by a front wall, a rear wall, and a base of the bag body preferably comprising a non-rigid (flexible) material, in particular a textile.

According to the embodiments mentioned, the load carrier can be transported by an automated conveying device.

Particularly preferably, the system has a first image capturing system for monitoring a first analysis region, and a second image capturing system for monitoring a second analysis region. In this regard, the first analysis region may be arranged upstream of a loading station for loading a load carrier with articles and/or unloading station for unloading a load carrier, and the second analysis region may be arranged downstream of the loading station and/or unloading station. Thus, for example, a loading operation and/or unloading operation can be checked by an image of the load carrier, in particular a placement region of the load carrier, being captured and evaluated before and after the loading operation and/or unloading operation. The load carrier may be a source load carrier, for example. The source load carrier is usually designed for storing a plurality of articles in a warehouse. The articles are provisioned for picking at a picking station by the source load carrier.

The system may, in particular, be configured such that a load carrier is checked each time it is provisioned in the analysis region. Thereby, it is possible to recognize and/or predict during a previous run that a problem will occur in a subsequent run, for example that not enough articles for a subsequent order are present in the source load carrier. Thus, the load carrier can already be transported to a correcting station and/or be filled with articles as a precaution.

Alternatively, the load carrier may be, for example, a target load carrier, which is provisioned at the picking station and is loaded with articles. Here, the system may particularly be designed such that an image of the target load carrier, in particular a placement region of the target load carrier, is captured before and after a loading operation, and a difference of the number of articles in the target load carrier is ascertained.

During picking, articles can be reloaded from the source load carrier into the target load carrier. This comprises an unloading operation for unloading the articles from the source load carrier and a loading operation for loading the target load carrier with the articles according to an electronically acquired order. A picking station may thus comprise an unloading and/or loading station.

In order to operate the system efficiently and to reduce an acquired data volume, the system may comprise a trigger unit, which is configured to check a precondition parameter for the detection of the number of articles. Here, it may be provided that the detection of the number of articles takes place only once the precondition parameter reaches a particular threshold value.

Hence, it may be provided, for example, that the precondition parameter comprises a total weight of the load carrier. Here, it may be provided that a threshold value indicated a certain total weight, wherein the detection of the number of articles by the system takes place only once the threshold value is reached or when it is undershot. The threshold value may be given for example by a warehouse control system (WCS). Thereby, the system can be operated particularly efficiently without capturing or collecting an excessive amount of images and/or data. Likewise, the precondition parameter may comprise a certain expected number of articles in the load carrier. The expected number of articles may be calculated by the warehouse control system (WCS), for example. The analysis region may be arranged along the automated conveying device. The analysis region may be formed by a conveying section of the conveying device. The automated conveying device connects an article receiving area, storage area, at least one working area, and possibly an article shipping area. The warehouse comprises the article receiving area, the storage area with storage locations, at least one working area, and the article shipping area. The at least one working area may comprise a correcting station for correcting an incorrect load or checking station for manually checking the number of articles in a load carrier and the like. The system may be arranged, for example, in a region of the article receipt, in particular between an article receiving area and a storage area. Thus, a quantity check and/or check of the number of articles can be performed at the article receipt.

Furthermore, the system may be arranged in a region of the article issue, preferably between a picking area and an article shipping area. Thereby, a quantity check and/or check of the number of articles can be performed at the article issue.

In order to realize an automated inventory, the system may be arranged in the warehouse, and a load carrier can be temporarily provisioned in the analysis region, wherein the quantity of articles analysis region the number of articles present in the placement region of the load carrier is ascertained by the system.

Preferably, the warehouse comprises a conveying device, with which the load carrier can be provisioned in the analysis region and/or removed from the analysis region. The conveying device may be formed as a stationary conveying device, for example as a belt conveyor or roller conveyor, or as a mobile conveying device comprising one or multiple, in particular driverless transport vehicles, for example autonomous mobile robots (AMR) or automated guided vehicles (AGV).

Usefully, the conveying device is configured to convey the load carrier at a constant speed, in particular through the analysis region. Here, the speed may amount to at least 1.5 m/s, preferably between 1.75 m/s and 2.5 m/s, particularly preferred 2 m/s.

The image capturing system is arranged such that a (two-dimensional) image of the placement region can be captured, wherein the placement region and possibly the load carrier are fully represented. For this purpose, a base surface of the receiving region is at least as big as, in particular bigger than, the placement surface of the placement region. For object recognition, a region of the (two-dimensional) image corresponding to the placement region may be defined as a so-called region of interest (ROI), which is evaluated using object recognition.

Furthermore, the data processing unit is configured to evaluate the captured image using object recognition, wherein the number of articles is ascertained. An algorithm of the object recognition may be implemented in the data processing unit using machine learning. Preferably, the object recognition is implemented in the data processing unit using an artificial neural network, in particular using a deep learning algorithm or a model-based approach. Here, the data processing unit and/or the algorithm can be trained by feeding it a plurality of images of placement regions, in which different amounts of articles are arranged, as well as a corresponding number of articles for each image and optionally further article data, such as shape, color, dimension, and/or weight of the articles. An advantage can be seen particularly in that the data processing unit can recognize a plurality of different articles as individual items regardless of their orientation and/or article type (sort).

It is useful if the system has a control unit, and the data processing unit generates a transport specification for the load carrier on the basis of the number of articles and transmits it to the control unit. Because of the transport specification, the flow of articles in the warehouse can be controlled efficiently and automatically, for example in that the load carrier is transported according to the transport specification.

The transport specification may comprise, inter alia, a destination and/or a particular transport route and/or a particular transport path. A destination for the load carrier may be a particular location in the warehouse, such as a storage location in the storage area, a working area, or the like. The transport path may be a conveying path, such as a main path, secondary path, discharge path, clearing path, or the like along the conveying device. Furthermore, it may be provided that the transport specification comprises a target speed, which specifies a particular transport speed for the load carrier. Thus, for example a plurality of load carriers can be consolidated along the transport route and/or the conveying path.

It may be provided that the data processing unit and the control unit are two separate units of the system, which are connected to one another via a communication means and/or data transfer means. As an alternative thereto, it may be provided that the control unit and the data processing unit are two sub-units of a checking unit. It is preferably also possible that the transport specification is based on a comparison of the ascertained number of articles with a target setting. Thereby, for example precise transport specifications for different fill and/or load level can be realized. Furthermore, an incorrect load can be recognized, and an appropriate transport specification can be generated, according to which the load carrier is transported by the conveying device to a working area, where a correction of the incorrect load is performed. The correction of the incorrect load may comprise an addition of an article or a removal of an article. For this purpose, the working area can be equipped with an input and/or output device, wherein the output device is configured to display a number of articles required in the placement region. The correction, in particular the addition and/or the removal of an article, may be performed by an operator or a robot and be confirmed using the input device.

In the simplest case, the target setting comprises the fill levels "loaded". Here, a falling below the target setting corresponds to the fill level "unloaded", thus it would, for example, be possible to distinguish between a loaded load carrier and an unloaded load carrier.

The target setting may alternatively or additionally comprise at least one target value.

The at least one target value may, for example, be a minimum number of articles or a maximum number of articles, wherein the load carrier is transported to a working area, for example to a correcting station, when the number of articles falls below or exceeds the target value.

Thus, for example, a tolerable interval for the number of articles can be defined with a first target value and/or the minimum number of articles and a second target value and/or the maximum number of articles.

Furthermore, the target value may indicate a number of articles required in the load carrier, wherein the load carrier is transported to a working area when the number of articles deviates from the target value.

A deviation of the ascertained number of articles from the target value may point to an incorrect loading of the load carrier, for example an incorrect picking.

Moreover, the ascertained number of articles may (alternatively or additionally) be detected and stored in a database, whereupon the load carrier is transported to a storage location in the storage area (in particular in the storage area of the warehouse) or to the checking station. Additionally, the system may comprise a feedback device, by means of which an erroneous ascertainment of the number of articles can be assigned to the corresponding captured image.

It is advantageous if the control unit is configured to control a conveying device of the warehouse, so that the conveying device conveys the load carrier according to the transport specification. Thereby, the system and/or the warehouse can be automated further. For this, the transport specification may comprise an instruction to the conveying device, for example, which instruction comprises changing the switch or the like for discharging the load carrier from the main path of the conveying device to a secondary path of the conveying device.

Advantageously, the data processing unit is configured to acquire article data using object recognition and/or to receive article data. This article data can be taken into account when ascertaining the number of articles or in addition to the number of articles when generating the transport specification. Thereby, the object recognition can be optimized, and an efficiency of the control of the article flow can be further increased.

The article data acquired using object recognition may comprise, inter alia, a dimension, a color, a quality status of the articles, such as scratches in a surface of an article and/or a defective packaging, a degree of overlap and/or orientation of the articles in the placement region.

Furthermore, the article identity may also be detected, for example using an identification marker arranged on the articles, comprising a machine-readable code, such as a bar code, QR code, or the like.

Moreover, process data may comprise, inter alia, a load carrier sequence, transport data, a total weight of the load carrier and/or reference data of the articles in the placement region. The process data may, for example, be transmitted from a warehouse management system (WMS) to the data processing unit and/or be fetched from a central database.

The warehouse management system may be formed as a part of the system for detecting the number of articles or may be superordinated to said system.

Transport data include, inter alia, a target and/or source location of the load carrier. Reference data may include a dimension, a color, a shape, a weight, and the like.

If the system is configured to recognize the articles in the placement region and to additionally identify them, a presence of a wrong article in the placement region of the load carrier can possibly be determined, and the load carrier can be transported to a working area. Preferably, the image capturing system has a first camera, which is arranged for capturing the image from a first angle, in particular 90° to a placement region of the load carrier. Thereby, the at least one image can be captured from a first perspective, preferably from a bird's-eye perspective. Here, the first angle is advantageously selected such that the entire placement region can be captured without partial regions of the placement region being covered, for example by the side walls of the load carrier. Here, the first angle can particularly be dependent on the load carrier used. Preferably, the first angle is between 40° and 100°, in particular 45°, 60°, or 90° to the placement surface of the load carrier.

Usefully, the image capturing system has at least one second camera, which is arranged for capturing at least one further image of the placement region from a further angle, wherein the further angle is different from the first angle. Thereby, the at least one further image may be captured from a further perspective. Using an analysis from at least two perspectives, a precision of the object recognition and/or the detection of the number of articles can be further increased, as, for example, articles located on top of one another can be recognized, which are covered by an uppermost article such that they are not captured from a bird's-eye perspective.

Analogously to the first angle, the second angle may also be dependent on the load carrier used. Preferably, the second angle is between 40° and 100°, in particular 45°, 60°, or 90° to the placement surface of the load carrier.

The first camera and/or the at least one further camera are preferably formed as area scan cameras, in particular having a resolution of at least 10 megapixels, preferably 15 to 20 megapixels.

It is advantageously provided that the system has at least one detection unit for detecting at least one load carrier parameter, preferably a total weight of the load carrier, wherein the detection unit transmits the at least one load carrier parameter to the data processing unit, and the data processing unit is preferably configured to take into account the load carrier parameter when evaluating the image. A consideration of the load carrier parameter can, for example, take place upon ascertainment of the number of articles and/or when generating the transport specification. Thereby, the object recognition and/or the control of the article flow can be further optimized. The total weight of the load carrier comprises the tare weight of the load carrier and possibly the weight of the articles in the placement region.

The at least one detection unit may be formed, for example, as

- a weighing device for measuring the total weight of the load carrier,
- a bar code or QR code scanner for detecting the article and/or load carrier identity,
- an RFID reader for detecting the article and/or load carrier identity, and/or
- an optical measuring device for detecting the dimensions of the load carrier, the dimensions of the articles and/or a fill level.

It is favorable if the data processing unit is connected to a data center via a communication module. The communication module may be configured for the, particularly wireless, data transfer between the data processing unit and the data center. For this purpose, the communication module preferably comprises a transmission and receiving device. Usefully, the data center comprises a corresponding transmission and receiving device. Furthermore, the data center may comprise a data collection, such as a database, a data cloud, a data warehouse and/or a data lake.

Advantageously, the data processing unit is configured to transmit a data set, preferably comprising an image of the placement region and/or the ascertained number of articles, to the data center and/or to receive a data set from it, wherein the data processing unit optimizes the object recognition on the basis of received data sets. Thus, on the one hand, the data set can be stored centrally. On the other hand, stored data sets can be received. The object recognition can be optimized and/or trained on the basis of the stored data sets. The stored data sets may have been stored manually or by the system at an earlier point in time. The stored data sets preferably stem from other, similar systems, which for example are operated in parallel, whereby different systems can essentially learn from one another. Moreover, the data sets may comprise a transport specification, particularly a previously generated one, reference data of the represented articles and the like. Depending on a load density of the load carrier, the image of the placement region may show a placement surface, in particular a bottom shelf, of the load carrier and/or articles at the bottom of the load carrier.

Data sets stored in the data center may be received by the data processing unit actively, that is after a request by the data processing unit, and/or downloaded, or be received passively, wherein in the case of passive receiving, the data sets are transmitted from the data center to the data processing unit, preferably without a preceding request by the data processing unit. The further object is achieved according to the invention in that in a data center of the initially mentioned type, the data sets each comprise at least one image of a placement region of a load carrier and an ascertained number of articles, wherein the ascertained number of articles indicates a number of articles in the placement region, and the data center is connected, via a communication module, to a plurality of systems according to one of the previously described aspects for transferring data sets between, in each case, one system and the data center.

An advantage obtained thereby can be seen particularly in that data sets from a plurality of systems can be managed and stored centrally and are thus available to the systems connected to the data center. Thereby, the systems can be consistently optimized and improved using acquired data and images of other systems. The individual systems connected to the data center can thus essentially learn from one another and optimize each other, whereby an increased efficiency and accuracy of the individual systems is achieved. For this purpose, the data center is preferably assigned an electronic memory.

Furthermore, it may be provided that the data center transmits stored data sets to the system in order to thus trigger and/or control an optimization of the object recognition. Optionally, it may be provided that the data center transmits stored data sets to the system after the same has issued a request. Thus, the optimization of the object recognition can be triggered and/or controlled by the system.

For this purpose, the superordinate data center may be formed, for example, as a digital platform, so that a plurality of previously described systems are interconnected via the data center. The systems connected to the data center may be installed at one location and/or in one warehouse or at a plurality of different locations and/or warehouses.

In this regard, the systems for monitoring and controlling a flow of articles in a warehouse may each be connected to the data center using a bidirectional communication connection. The bidirectional communication connection allows for a data transfer from the system to the data center as well as from the data center to the system. For this purpose, the systems may each comprise a first communication module and the data center may comprise a second communication module. The first communication module of a system may be a separate unit or an integral component of the data processing unit.

Thereby, the systems connected to and/or linked up with the data center can individually upload data sets and/or receive and/or download data sets stored in the data center.

The ascertained number of articles may be ascertained by one of the systems. Alternatively, the ascertained number of articles may also be a manually ascertained number of articles. For this purpose, the number of the articles in the existing images of placement regions can be counted manually or generated manually in that a specific and accordingly known number of articles is placed in a placement region of a load carrier and subsequently, an image of said placement region is captured.

Advantageously, it is provided that an algorithm for machine learning is implemented in the data center, which algorithm can be fed the data sets in order to improve an algorithm for object recognition. In this process, captured images and/or detected numbers of articles from a plurality of systems can be fed into the algorithm for machine learning, or machine learning algorithm, in order to improve the algorithm for object recognition. The improved algorithm for object recognition can be fed into the data processing units of the systems connected to the data center by the data center. Here, an advantage consists particularly in that the individual data processing units may be formed having lower computing power, since an improvement of the algorithm for object recognition can take place centrally.

The data sets may additionally comprise article data, preferably reference data of the articles, such as, inter alia, dimensions, the individual weight, a shape, a dimensional stability and/or a shape of the articles, a stored number of the articles in the load carrier, an order frequency, particularly one that is empirically determined, and/or a storing and/or retrieving frequency of the articles. The dimensional stability of articles may vary, in particular depending on their packaging. Accordingly, for example items of clothing packaged in polybags have only a low dimensional stability whereas articles packaged in cartons have a high dimensional stability.

The further object is achieved according to the invention, utilizing the previously described advantages and effects in that in a warehouse system of the initially mentioned type, the system is formed according to one of the previously described aspects.

Furthermore, the object according to the method is achieved in that in a method of the initially mentioned type, the image is evaluated by the data processing unit using an algorithm for object recognition, wherein articles arranged in the placement region are recognized as objects, and a number of articles is ascertained automatically, whereupon the load carrier is conveyed away from of the analysis region.

An advantage of the method according to the invention is evident particularly in that individual articles in the placement region of the load carrier are recognized and automatically counted, regardless of their arrangement and article type (sort). Thus, the number of articles can be ascertained quickly both in a load carrier with articles of just one type and in a load carrier with a mixed load, whereby inter alia an automated checking of the number of articles and/or an automated inventory is made possible. Thereby, for example human errors during a manual checking of the inventory can be avoided, and the efficiency of the of the warehouse operation can be increased. For this purpose, the articles in the placement region of the load carrier are recognized and automatically counted.

In order to perform the method efficiently and to reduce an acquired data volume, it may be provided that a precondition parameter, in particular a total weight of the load carrier and/or an expected number of articles in the load carrier, is checked, and the image of the placement region of the load carrier is captured only when the precondition parameter reaches, falls below, or exceeds a defined threshold value.

It is favorable if a transport specification for the load carrier is generated based on the ascertained number of articles, according to which transport specification the load carrier is conveyed. Thus, the flow of articles can be controlled essentially depending on the fill level in a load carrier, and the warehouse can thus be operated particularly efficiently.

Usefully, the load carrier is moved through the analysis region at a constant speed, during which the image is captured. The number of articles can thus be detected during ongoing operation, which is why it is not necessary that the load carrier is stopped in the analysis region. Thereby, a particularly efficient and fast operation of the warehouse is made possible.

In this process, the image of the placement region is in particular captured using a short exposure time, for example an exposure time of 0.3 ms to 15 ms, preferably a maximum of 1 ms. Advantageously, the exposure time is selected such that an image can be captured of the placement region of a load carrier, which is moved through the analysis region at a speed of at least 0.5 m/s, 1 m/s to 3 m/s, particularly preferably at about 2 m/s.

It is favorable if the image is evaluated in real time, and the transport specification is generated in real time. Thus, the load carrier can be moved through the analysis region and out of it without the load carrier having to be stopped in the analysis region. The transport specification is generated in real time and is thus already available when the load carrier leaves the analysis region.

It is advantageous if the number of articles is compared to a target value, wherein the load carrier is transported to a working area when the target value is undershot or exceeded or is transported to a storage location or an article issue when the number of articles matches the target value. Thus, it can be ensured, for example for customer orders, that only load carriers, for which a filling is determined to be proper and/or as ordered, are stored in the storage area and/or transported to the article issue.

In this regard, the target value can be defined with a permitted deviation, according to which the transport specification is generated. A permitted deviation may amount to, for example, 1%, 2%, 5% or 10%.

Likewise, it may be provided that an exceeding is permitted, and the load carrier is transported to the working area only when the target value is undershot, or vice versa.

Usefully, a total weight of the load carrier is measured using a weighing device and transmitted to the data processing unit, whereupon the number of articles in the placement region of the load carrier is calculated from a known individual weight of the articles and a known tare weight of the load carrier and taken into account in the detection of the number of articles. Thereby, the accuracy of the detection of the number of articles can be additionally increased during the detection of the number of articles of a load carrier with articles of just one type. The individual weight of the articles can be determined beforehand by weighing an individual article, or it may be known for example from manufacturer information. Preferably, the individual weight of the articles is stored in the article data. Using the identification marker optionally arranged on the load carrier, the load carrier can be identified, and the articles placed therein as well as the corresponding article data can be fetched, whereby the individual weight of the articles is known.

Analogously, the tare weight of the load carrier can be measured beforehand by weighing the empty load carrier, or it may be known for example from manufacturer information. Preferably, the tare weight of the load carrier is linked to the identification marker optionally arranged on the load carrier and is stored in an electronic data memory, which is associated, for example, with the warehouse management system or the data processing unit. The load carrier can be identified using the identification marker and thus, its tare weight can be fetched.

Here, the number of articles calculated from the total weight of the load carrier can be compared to the number of articles ascertained using object recognition. If there is a deviation between the calculated number of articles and the ascertained number of articles, in particular exceeding a particular tolerance interval, the load carrier can be discharged to a working area, for example a checking station, at which the number of articles is checked by a processing person using manual counting of the articles. The manually counted number of articles may also be transmitted to the data processing unit, so that the manually counted number of articles can be linked in terms of data technology/electronically to the captured image. Thus, for example a so-called "supervised learning" for optimizing the object recognition can be realized during ongoing operation.

It may preferably be provided that the algorithm for object recognition is optimized in a teaching step using machine learning, on the basis of existing article data and/or stored images of placement regions of load carriers, in that a plurality of images of placement regions or a plurality of images of placement regions and numbers of articles corresponding to the images are fed into a computing unit, on which computing unit the algorithm for object recognition is implemented, whereupon a test run is performed, during which a plurality of images of placement regions are fed into the computing unit, and the corresponding number of articles is ascertained by the computing unit using the algorithm for object recognition. In this regard, the data processing unit may comprise the computing unit. Alternatively, the data center may comprise the computing unit. The computing unit may also be an independent unit, for example a computer, on which the teaching step is performed. An algorithm for object recognition, optimized in the teaching step, can subsequently be fed to a data processing unit of the system.

For machine learning, a plurality of images, in particular at least 10,000 images, preferably about 2,500 images, each of a placement region of a load carrier with a different number of articles in each case are fed into the data processing unit and/or transmitted to it. The individual images are each linked to the number of articles corresponding to the respective image.

Thus, the data processing unit can be trained on the basis of these images beforehand and/or before initial operation of the warehouse and optionally also during operation and/or maintenance breaks, and the object recognition can be optimized.

After the teaching step, the system can be tested in a test run by the number of articles in a plurality of load carriers with a known number of articles being ascertained by the system. This may take place by feeding images, which are evaluated by the data processing unit. Thus, it is not necessary for the entire system to be taken into operation for the test run.

The number of articles corresponding to the individual images may be counted manually beforehand, or the images for the test run may be generated by deliberately placing a specific number of articles in the placement region and subsequently capturing the placement region photographically, so that the number of articles visible in the images is known.

If the hit rate during the test run falls below a desired value, for example below 80%, the teaching step can be repeated using further images, until the hit rate reaches at least the desired value. The hit rate refers to a portion of the load carriers checked during the test run, in which the ascertained number of articles matches the known number of articles.

Advantageously, the object recognition of the data processing unit is optimized during ongoing operation using machine learning using centrally stored images and numbers of articles corresponding to said images. For machine learning, particularly images stored in the data center and numbers of articles corresponding to said images can be transmitted to the data center and/or be fetched from the same. The images stored in the data center may originate from a single system, from multiple such systems in a warehouse, or from multiple systems in different warehouses. Thus, a self-learning system for monitoring and controlling a flow of articles in a warehouse can be realized. Here, a self-learning system is to be considered a system which, on the one hand, learns from native images and acquired data and/or from images of identical systems, which are interconnected with the system via a data center.

It is preferably provided that, in case of a deviation of the ascertained number of articles from the target value, an input prompt is directed at a user, and a number of articles manually counted by the user is recorded and fed into the data processing unit, whereupon the ascertained number of articles is compared to the manually counted number of articles by the data processing unit, and the algorithm for object recognition is adapted based on the comparison.

The deviation from the target value may point to, on the one hand, an error not related to the system, for example an incorrect loading of the load carrier, and, on the other hand, point to an erroneous recognition by the data processing unit. Thus, a comparison of the ascertained number of articles with the manually counted number of articles allows realizing a feedback device for improving the algorithm for object recognition. Here, it can be determined, on the one hand, that the ascertained number of articles is correct, and the deviation from the target value has occurred due to an incorrect loading of the load carrier. On the other hand, it can be determined that the number of articles has been incorrectly ascertained, leading to the deviation from the target value. In order to ascertain the manually counted number of articles, the number of the articles in the placement region of the load carrier is counted by the user.

BRIEF DESCRIPTION OF THE DRAWINGS

For the purpose of better understanding of the invention, it will be elucidated in more detail using the figures below.

These show in a respectively very simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
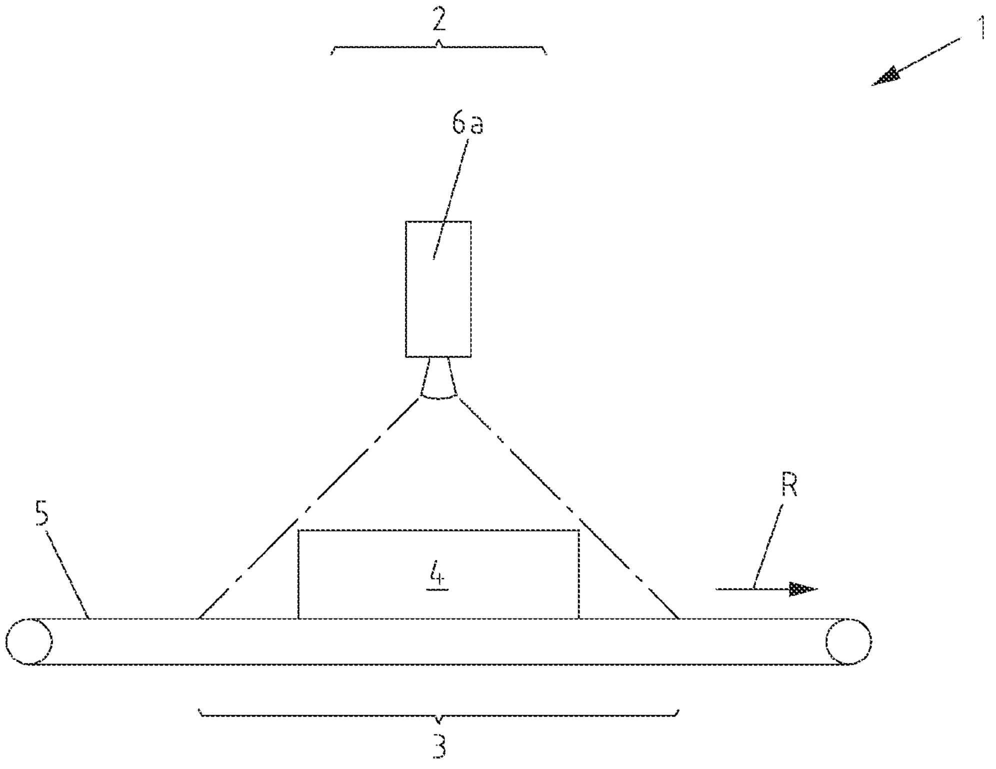
FIG. 1 a system for detecting a number of articles in a placement region of a load carrier in a warehouse.

FIG. 1 shows a system 1 for detecting a number of articles. The system 1 comprises an image capturing system 2 as well as an analysis region 3, in which a load carrier 4 can be provided, as it is shown in FIG. 1. The analysis region 3 is essentially that region which is visible for the image capturing system 2 and/or can be represented by it.

A provisioning of the load carrier 4 can take place manually, using a handling robot or, as shown in FIG. 1, by automated conveying device 5. In the example shown, the load carrier 4 is transported by the conveying device 5 in a conveying direction R and in this process, is moved through the analysis region 3.

According to the embodiment shown, the load carrier 4 is formed by a container, a carton, or a tray. In this regard, a placement region 8 not visible in FIG. 1 may correspond to an internal volume of the container, carton, or tray. The placement region 8 is visible from above and/or from a bird's-eye perspective. Such a load carrier 4 comprises a bottom shelf, side walls rising up from it and at least one loading opening bounded by the side walls. If the side walls are designed to be rather low, they can also be referred to as a side edge, as this would be the case for a tray.

The load carrier 4 may be transported by an automated conveying device 5, for which purpose it has a transport surface. The transport surface is formed on a bottom side of the bottom shelf facing away from the placement region 8. The placement surface is formed on an upper side of the bottom shelf facing the placement region.

Preferably, the conveying device 5 is designed such that it is able to ensure a constant, vertical distance between the image capturing system 2 and the load carrier 4 in the analysis region 3, while the load carrier 4 is being transported through the analysis region 3.

In FIG. 1, the conveying device 5 is formed as a stationary conveying device 5, for example by a belt conveying device or a roller conveying device. Alternatively, the conveying device 5 may also be formed as a mobile conveying device 5, for example comprising one or multiple, preferably driverless, transport vehicles.

The image capturing system 2 shown in FIG. 1 has a first camera 6*a*, which is arranged for capturing an image of the placement region 8 of the load carrier 4 from the bird's-eye perspective. For this purpose, an optical axis of the first camera 6*a* is oriented essentially orthogonal to a placement surface of the bottom shelf and/or essentially orthogonal to a conveying plane of the conveying device 5, on which the load carrier 4 is transported. Preferably, a placement surface of the load carrier 4 is positioned in or parallel to the conveying plane.

Figure 2:
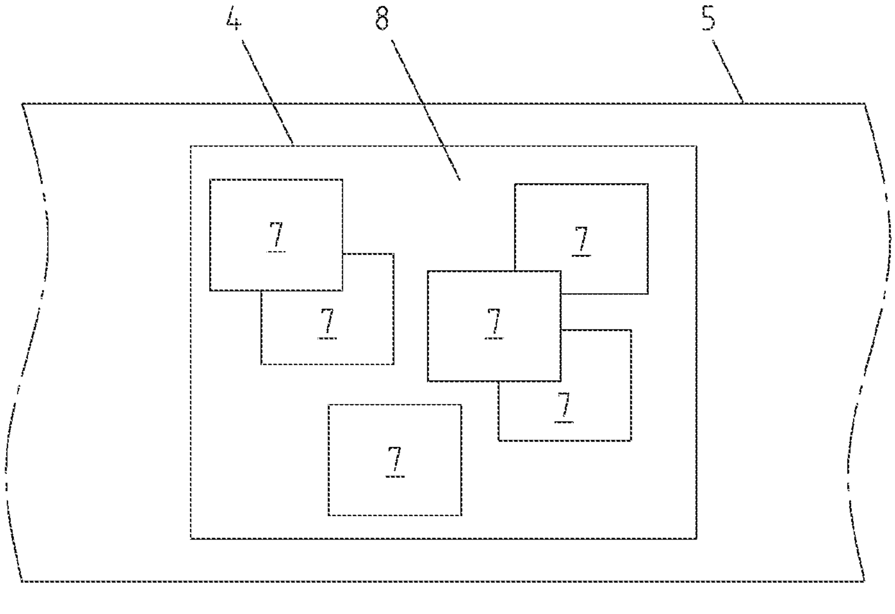
FIG. 2 a top view onto a detected load carrier.

FIG. 2 shows the load carrier 4 from the bird's-eye perspective. In this representation, the articles 7 arranged in the placement region 8 of the load carrier 4 are visible. The articles 7 are placed in the receiving region in an essentially disorganized manner, so that an overlap of the articles 7 may possibly occur. In the example shown, the articles 7 are schematically represented as rectangles. Of course, in reality, the articles 7 may have any shape. Furthermore, it is possible that the load carrier 4 is loaded with articles 7 of just one type or with a mix of article types.

Figure 3:
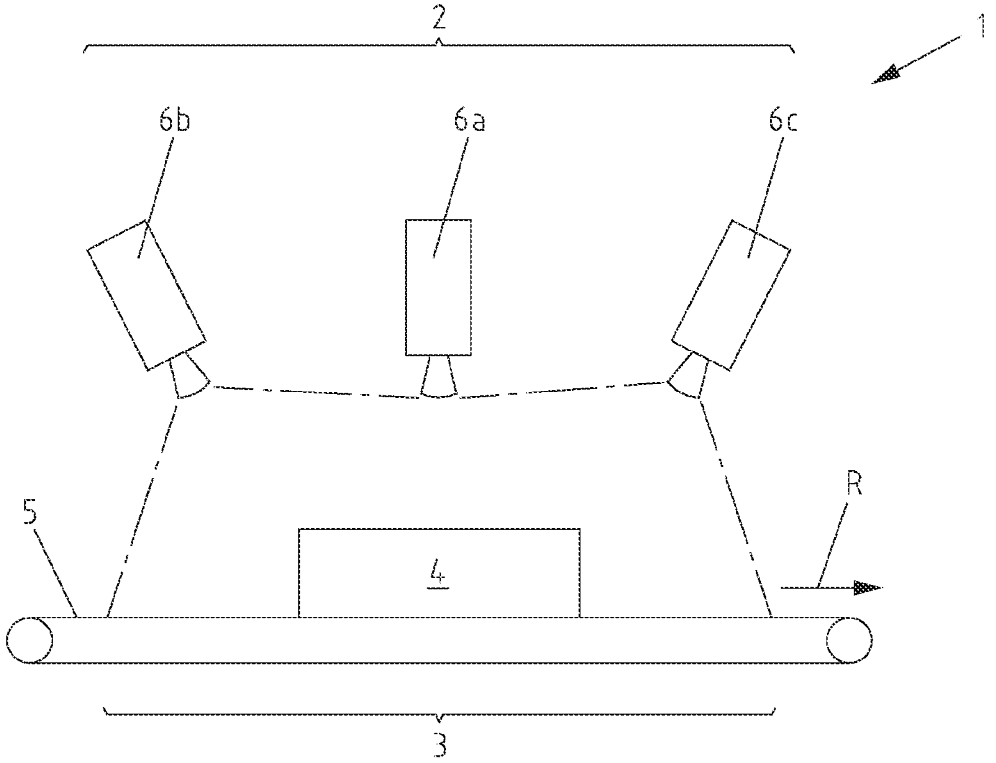
FIG. 3 an alternative embodiment of the system for detecting the number of articles.

In FIG. 3, an alternative embodiment of the system 1 of FIG. 1 is shown. The system 1 is formed essentially as in the previously shown exemplary embodiment. Here, as well, essentially any conveying device 5 may be provided. Furthermore, the image capturing system 2 has a second camera **6*b* and a third camera 6*c* in addition to the first camera 6*a*. The second camera 6*b* and the third camera 6*c* are arranged for capturing an image of the placement region 8 of the load carrier 4 from a second perspective and a third perspective. For this purpose, the optical axis of the first camera 6*a* and/or the optical axis of the second camera 6*b* each enclose an angle with the placement surface of the placement region 8**, which angle is different from 90°.

Figure 4:
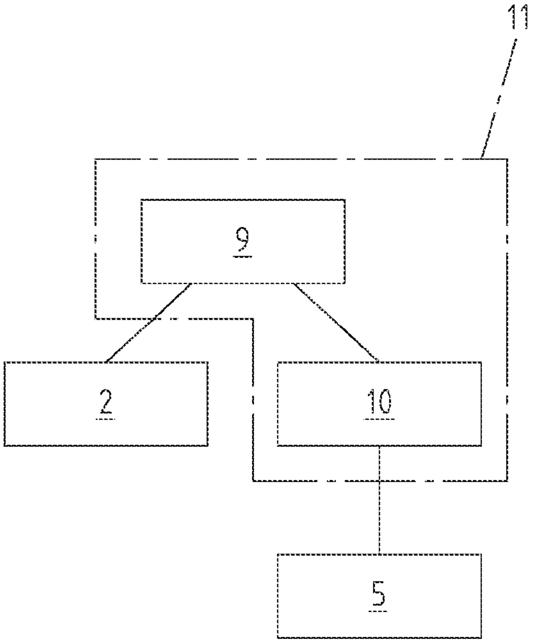
FIG. 4 a block diagram of the system for detecting the number of articles.

FIG. 4 shows a schematic representation of the system 1 for detecting the number of articles.

The image capturing system 2 is connected to a data processing unit 9, so that images captured by the image capturing system 2 can be transmitted to said data processing unit 9. For this purpose, the image capturing system 2 as well as the data processing unit 9 may each have a communication interface, for example a USB port or the like, so that a communication connection between the image capturing system 2 and the data processing unit 9 can be realized using a data cable. As an alternative thereto, the communication interface may comprise a transmission and receiving device, so that the communication interface is realized using a wireless network, in particular a local radio network (wireless local area network; WLAN) or based on a Bluetooth standard.

Moreover, the data processing unit 9 is configured to receive images from the image capturing system 2 and to evaluate them using an algorithm for object recognition in order to ascertain a number of articles in the placement region 8. Furthermore, the data processing unit 9 is configured to save the ascertained number of articles and/or to generate a transport specification for the load carrier 4, which transport specification is based on the ascertained number of articles.

Moreover, the data processing unit 9 is connected to an electronic control unit 10, so that the transport specification can be transmitted to the control unit 10. For this purpose, the control unit 10 as well as the data processing unit 9 may each have a communication interface, which comprises, for example, a USB port or the like and/or a transmission and receiving device, so that a communication connection between the data processing unit 9 and the control unit 10 may also be realized using a data cable or a wireless network, in particular a local radio network (wireless local area network; WLAN) or based on a Bluetooth standard. Alternatively, the data processing unit 9 and the control unit 10 may be two sub-units of a checking unit 11 of the system 1. Such a checking unit 11 is adumbrated in FIG. 4 as a dot-dashed box.

Advantageously, the control unit 10 has a communication connection, for example a wireless one or one using a cable, to the conveying device 5, so that the conveying device 5 can be controlled, and a transport of the load carrier 4 according to the transport specification can be prompted.

The transport specification preferably comprises a destination, for example a particular working area or storage location, a transport route, for example along a main path or along a secondary path of the conveying device 5, and/or a changing of the switch of the conveying device 5 or the like.

In order to acquire additional article data, the system 1 may have further detection devices not shown in FIG. 1 to FIG. 4, which detection devices are connected to the data processing unit 9 so that acquired data can be transmitted to said data processing unit 9. For example, a weighing device may be provided, which is preferably integrated into the conveying device 5. The weighing device may be configured to acquire a total weight of the load carrier 4 and to transmit said weight to the data processing unit 9.

Figure 5:
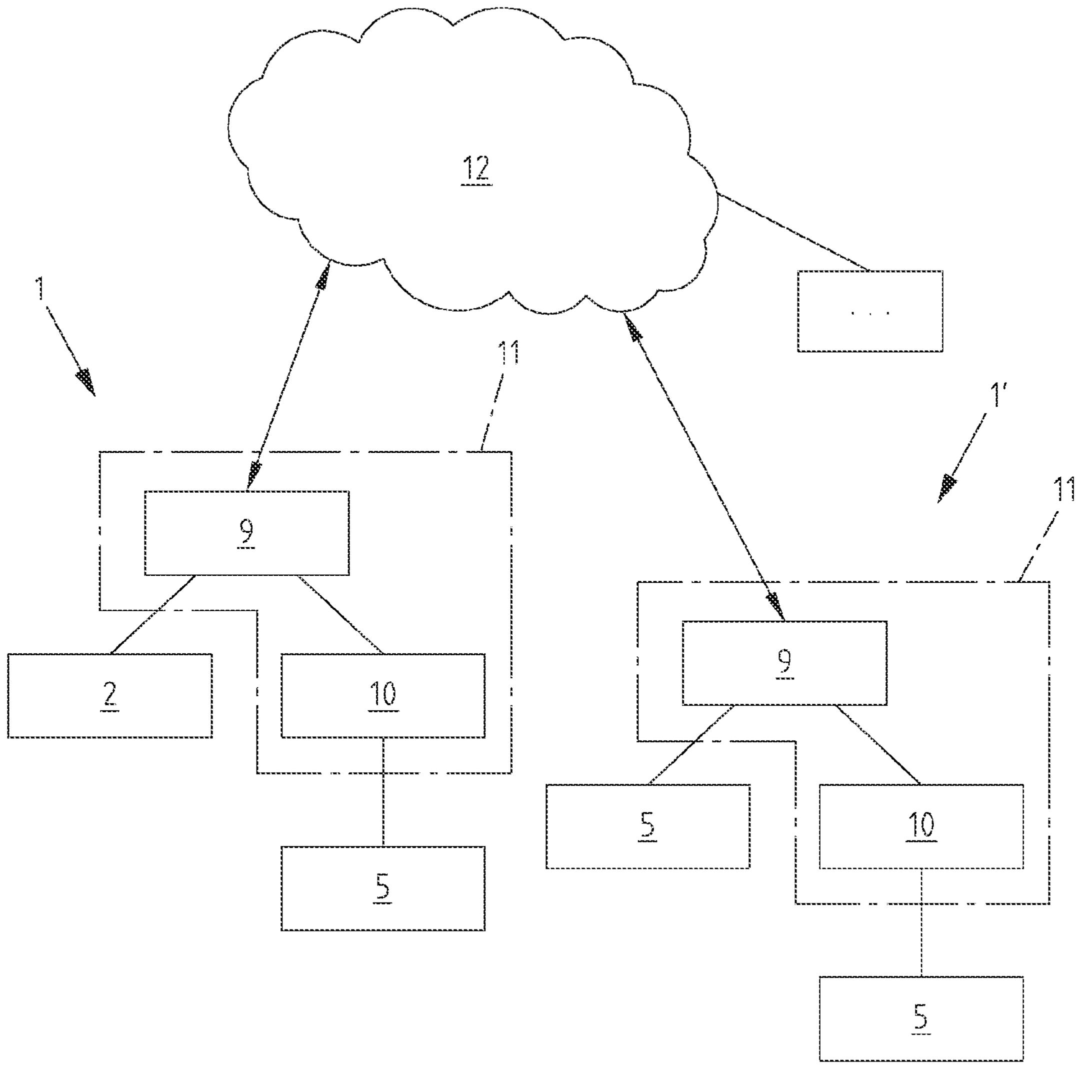
FIG. 5 a network of a plurality of systems for detecting the number of articles and a data center.

FIG. 5 shows a schematic representation of a network with a plurality of previously described systems 1, which are interlinked and/or connected via a data center 12. The network may essentially comprise any number of systems 1.

In the example shown, at least a first system 1 and a further system 1' are connected to the data center 12. In FIG. 5, a box with three dots adumbrates optional further systems 1', which may also be connected to the data center 12.

Here, the systems 1, 1' are each connected to the data center 12 using a bidirectional communication connection (adumbrated by a double arrow). Thereby, on the one hand, a data transfer from the system 1, 1' to the data center 12 is possible, and on the other hand, a data transfer from the data center 12 to the system 1, 1' is possible. For this purpose, the systems 1, 1' may each have a first communication module, and the data center 12 may have a second communication module. The communication modules may each have a transmission and receiving device, a connection for the cable connection, for example a USB port, an ethernet port, or the like.

The communication connection between the data center 12 and the systems 1, 1' may preferably be established by a data network, in particular an internet connection, or wirelessly, in particular using the Bluetooth standard, or via a local radio network (wireless local area network; WLAN). The data center 12 may furthermore be formed as a platform set up on a server. The server may, for example, be connected to the individual systems 1, 1' via an internet connection.

In a method for detecting the number of articles in the placement region 8 of the load carrier 4, the load carrier 4 is provisioned in the analysis region 3, and at least one image of the placement region 8 of the load carrier 4 is captured with the image capturing system 2. The provisioning of the load carrier 4 in the analysis region 3 may comprise a continuous transport movement of the load carrier 4 through the analysis region 3 or the stopping of the load carrier 4 in the analysis region 3.

The captured image is transmitted to the data processing unit 9, whereupon the image is evaluated using an algorithm for object recognition, in order to determine the number of articles. Furthermore, a transport specification for the load carrier 4 is generated. Moreover, the number of articles can be stored.

In a next step, the transport specification is transmitted to the control unit 10, which controls the conveying device 5 such that the load carrier 4 is transported to a particular destination according to the transport specification. The destination may be a storage area, a storage location in the storage area (in particular in the storage area of the warehouse), a working area, such as a picking station, a packaging and/or shipping station, a correction working area, or the like.

Figure 6:
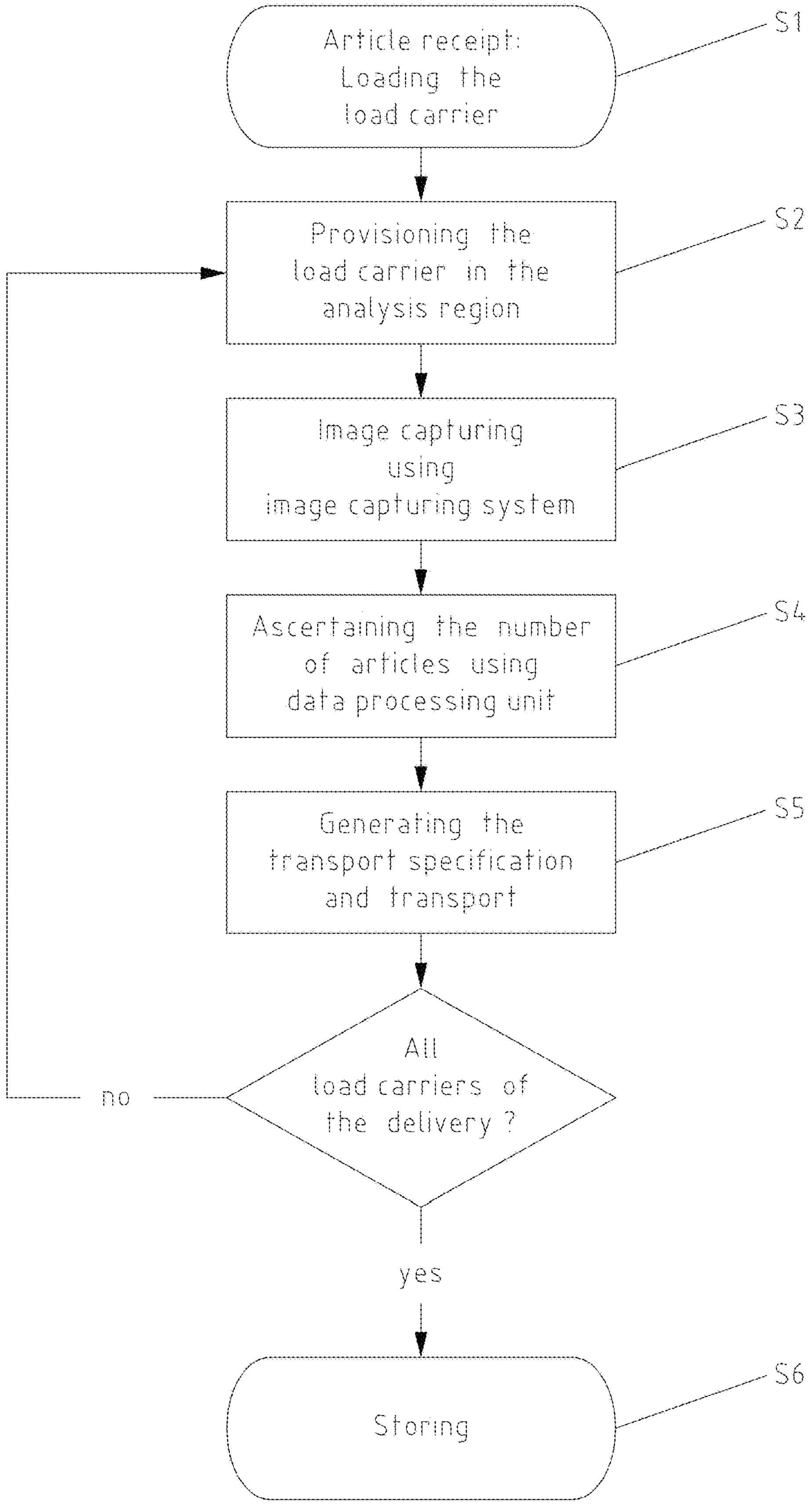
FIG. 6 a flowchart for a method for detecting the number of articles at the article receipt.

FIG. 6 shows a schematic representation of a method for detecting the number of articles at the article receipt. For this purpose, the previously described system 1 may be arranged between an article receiving area at the article receipt and the storage area of the warehouse. The article receiving area comprises one or multiple working areas. The working area may be formed by a reloading station, where articles are reloaded into a source load carrier as described below.

In a first step S1, articles 7 delivered to the article receipt may be reloaded into one or multiple load carriers 4, preferably source load carrier, such as source containers. Usually, only articles of a single type are provisioned on delivery pallets. Here, the articles 7 of the delivery are distributed onto one or multiple load carriers 4 such that they are arranged in a single layer or a maximum of two layers in the load carrier 4. With this optional step, the ascertainment of the number of articles can be simplified, as possibly, one image from a single perspective, preferably the bird's-eye perspective suffices for representing all articles 7 in the placement region 8. Furthermore, an evaluation result of the object recognition can be improved.

In a second step S2, the load carrier 4 or one of the load carriers 4 is provisioned in the analysis region 3 of the system 1. Preferably, this takes place manually, using a handling robot or the conveying device 5.

Moreover, in a third step S3, at least one image of the placement region 8 of the load carrier 4 is captured. Here, an image is captured from a first perspective, in particular from above and/or from a bird's-eye perspective, using the first camera 6*a* of the image capturing system 2. If a second camera 6*b* and/or a third camera 6*c* are present, it is also possible for one or multiple further images to be captured by each of the second camera 6*b* and/or the third camera 6*c*, in particular from one or multiple further perspectives.

The captured image is transmitted from the image capturing system 2 to the data processing unit 9. In order to ascertain the number of articles corresponding to the respective load carrier 4, the captured image is evaluated in a fourth step S4 using an algorithm for object recognition. Here, the individual articles 7 arranged in the placement region 8 of the load carrier 4 are recognized as objects by the data processing unit 9, and the ascertained number of articles is stored. This step may be performed for all images corresponding to a load carrier 4 if multiple images are captured, in particular by multiple cameras.

In a fifth step S5, a transport specification is generated by the data processing unit 9 on the basis of the number of articles, according to which transport specification the load carrier 4 is transported to a working area or to a storage location in the storage area.

Steps two to five may be repeated for all load carriers 4 corresponding to one delivery, so that for each of the load carriers 4 a corresponding number of articles is ascertained. Furthermore, the relevant numbers of articles may be added up to a total number of articles and be compared to a delivery quantity. This takes place for example using the data processing unit 9. Thus, it is possible to check exactly upon delivery whether a correct number of the articles 7 has been delivered.

In a sixth step S6, the load carrier 4 can be stored. If the articles 7 were distributed onto multiple load carriers 4 in the first step S1, they may first be united in one load carrier 4 in order to reduce the storage space required for the articles 7, whereupon said load carrier 4 is stored.

Figure 7:
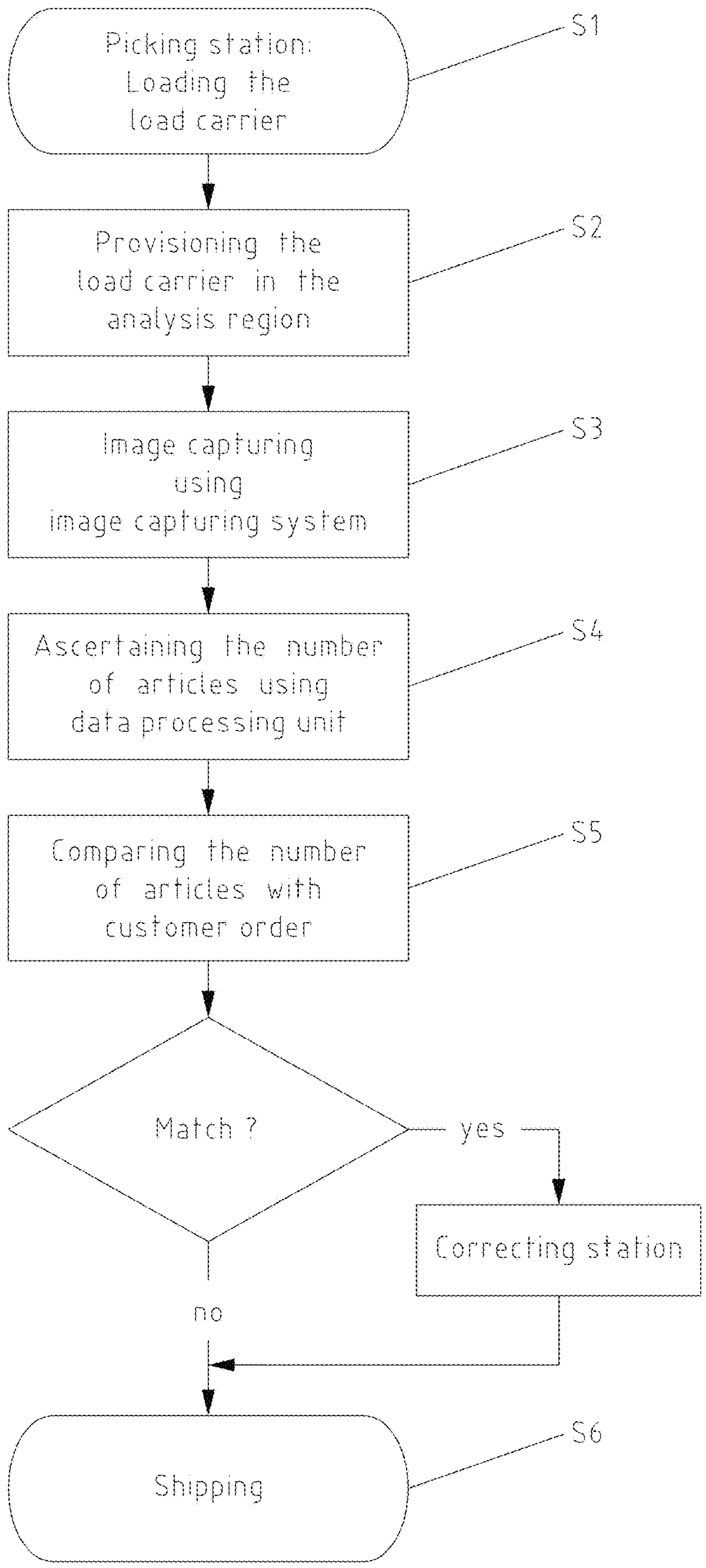
FIG. 7 a flowchart for a method for detecting the number of articles at the article issue.

FIG. 7 schematically shows a method for detecting the number of articles at the article issue. For this purpose, the previously described system 1 may be arranged between a picking area and an article shipping area at the article issue. The picking area comprises one or multiple working areas. The working area may be formed by a picking station where articles are removed from a source load carrier and picked into a target load carrier according to an order.

The load carrier 4, in particular a target load carrier, is loaded, in a first step S1, according to an order at a picking station and is subsequently transported from the picking station to the analysis region 3. In steps two to four S2, S3, S4, the number of articles corresponding to the load carrier 4 is ascertained as described above.

In the fifth step S5, the ascertained number of articles is compared to a corresponding customer order, an according transport specification is generated, and the load carrier 4 is transported to the respective destination according to the transport specification.

If the ascertained number of articles matches the order, the load carrier 4 may be transported to a shipping working area, for example. However, if the ascertained number of articles deviates from the order, this points to a picking error. The load carrier 4 may then, for example, be transported to a correction working area.

However, the working area may also be formed by a packing area where articles are packed into a target load carrier according to an order, wherein the target load carrier in this case corresponds to a shipping loading aid, for example a shipping carton. At the packing place, a final check may be performed. If the ascertained number of articles matches the order, the shipping loading aid may be closed and shipped. However, if the ascertained number of articles deviates from the order, this points to a picking error. The shipping loading aids may then, for example, be transported to a correction working area.

Figure 8:
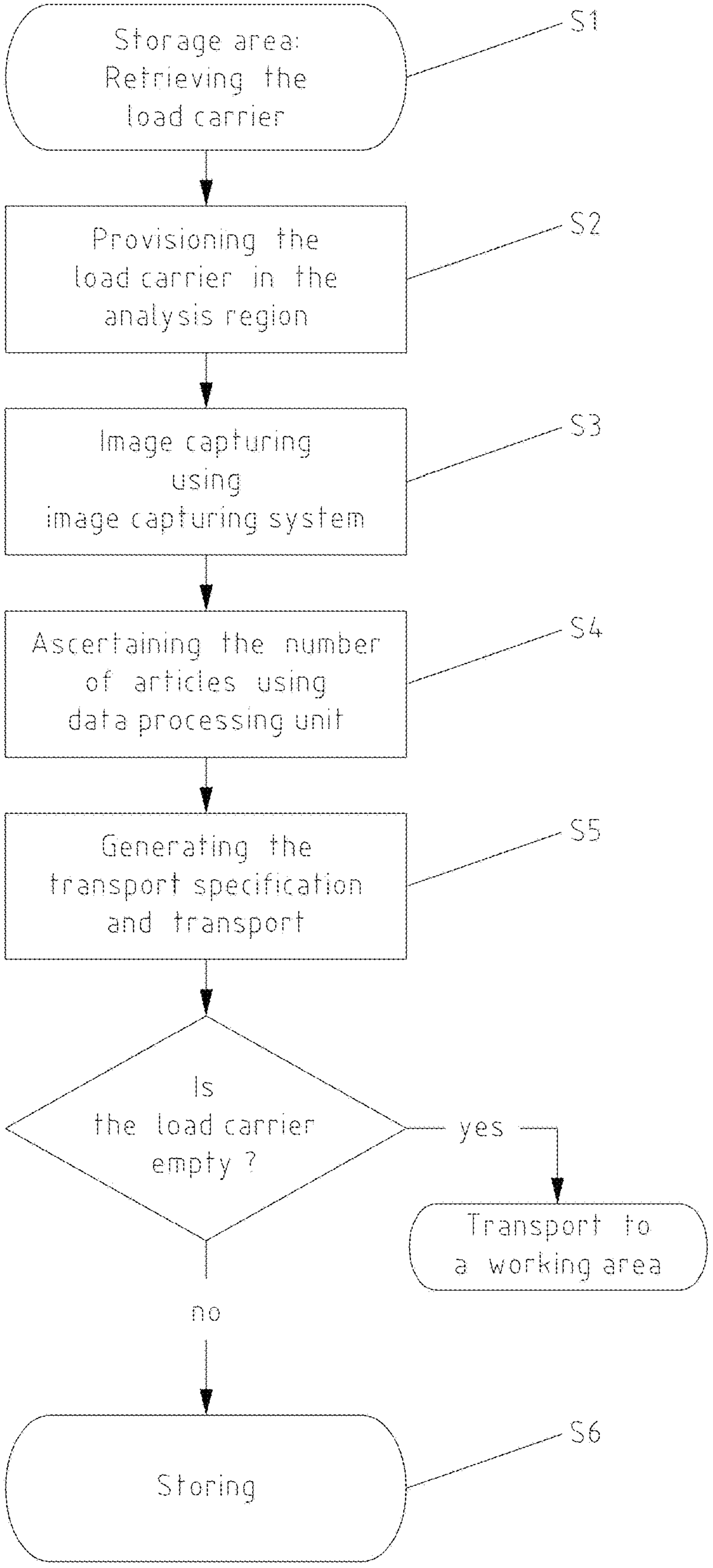
FIG. 8 a flowchart for a method for detecting the number of articles in an automatic inventory.

FIG. 8 schematically shows a method for detecting the number of articles, in which an automatic inventory can be realized.

In the case of the automatic inventory, in the first step S1, a load carrier 4 is retrieved from the storage area and provisioned in the analysis region 3 of the system 1 for detecting a number of articles in the load carrier 4. This is preferably performed using an automated conveying device 5.

In steps two to four S2, S3, S4, the number of articles corresponding to the load carrier 4 is ascertained and stored, as described above.

In the fifth step S5, a transport specification is generated by the data processing unit 9, which is based on the ascertained number of articles. Thus, a filled load carrier 4 can be transported back into the storage area by the conveying device 5. An empty load carrier 4 may, however, be transported to a working area and, for example, be re-filled at the article receipt.

In the case of the automatic inventory, steps one to five may, of course, be performed sequentially for a plurality of the load carriers 4, in particular all load carriers 4, of the warehouse.

Furthermore, a learning process, not shown in FIG. 6 to FIG. 8, comprising a teaching step and a test run, may be provided in each case in such methods for detecting the number of articles, which learning process is, in particular, performed before an initial operation of the system 1, 1'.

In the teaching step, an algorithm implemented in the data processing unit 9 and/or an artificial neural network present in the data processing unit 9 or the like is trained on the basis of a plurality of existing images of placement regions 8, each with a known corresponding number of articles. Here, the images as well as the corresponding numbers of articles are fed into the data processing unit 9. This may be performed particularly on the basis of at least 100 images, preferably about 200 images.

After the teaching step, a test run is performed. In this process, a plurality of images with a known number of articles is fed into the data processing unit 9. The data processing unit 9 evaluates the images using object recognition in order to ascertain a corresponding number of articles for each of the images. Moreover, the data processing unit 9 issues which images were poorly evaluable and/or with low confidence and which images could be evaluated well and/or with high confidence. The ascertained number of articles of images evaluated with low confidence can be compared to the corresponding known number of articles in order to determine whether a correct number of articles was ascertained. Furthermore, the number of articles ascertained for each of the images can be compared to the corresponding known number of articles in order to determine the hit rate. Here, the hit rate indicates the portion of the images for which the ascertained number of articles matches the known number of articles. If the hit rate falls below a predefined value, for example below 80%, the test run as well as the teaching step can be repeated using further images and/or load carriers 4, until the hit rate reaches at least the predefined value.

With the described system 1, 1' and method, it is thus possible to realize an automated detection of the number of articles at the article receipt and/or at the article issue of a warehouse as well as an automated inventory in a warehouse, whereby an essential component of a fully automated warehouse can be actualized.

Finally, it should also be noted that the scope of protection is determined by the claims. Nevertheless, the description and drawings are to be used for construing the claims.

In particular, it should also be noted that the system shown may in reality comprise more or fewer components than those shown. In some cases, the shown systems and/or their components may not be depicted to scale and/or be enlarged and/or reduced in size.

LIST OF REFERENCE NUMBERS

1, 1' System
2 Image capturing system
3 Analysis region
4 Load carrier
Conveying device
6*a*, 6*b*, 6*c* Camera
7 Article
8 Placement region
9 Data processing unit
10 Control unit
11 Control unit
12 Data center
R Conveying direction
S1 First step
S2 Second step
S3 Third step
S4 Fourth step
S5 Fifth step
S6 Sixth step

The invention claimed is:

1. A system for detecting a number of articles in a placement region of a load carrier in a warehouse, comprising:

an analysis region configured to receive the load carrier, an image capturing system for monitoring the analysis region, and a data processing unit, wherein the image capturing system is configured to capture an image of the placement region of the load carrier and to transmit the same image to the data processing unit, wherein the data processing unit is configured to evaluate the image transmitted by the image capturing system using an algorithm for object recognition, in order to recognize the articles arranged in the placement region of the load carrier as objects and to ascertain the number of articles in the placement region of the load carrier, wherein the algorithm for object recognition is implemented in the data processing unit using machine learning based on a Plurality of images that represent the placement region of the load carrier with different number of articles, wherein the images are provided to the data processing unit, and wherein each one of the plurality of images is linked to the number of articles corresponding to the respective image.

2. The system according to claim 1, wherein the system further comprises a control unit, and wherein the data processing unit generates a transport specification for the load carrier based on the number of articles and transmits the transport specification to the control unit.

3. The system according to claim 2, wherein the control unit is configured to control a conveying device of the warehouse, and wherein the conveying device conveys the load carrier according to the transport specification.

4. The system according to claim 1, wherein the data processing unit is configured to detect article data using object recognition and/or to receive article data.

5. The system according to claim 1, wherein the image capturing system has a first camera arranged for capturing the image from a first angle to a placement surface of the load carrier.

6. The system according to claim 5, wherein the image capturing system has at least one further camera arranged for capturing at least one further image of the placement region from a further angle, and wherein the further angle is different from the first angle.

7. The system according to claim 1, wherein the system further comprises at least one detection unit for detecting at least one load carrier parameter, and wherein the detection unit transmits the at least one load carrier parameter to the data processing unit.

8. The system according to claim 1, wherein the data processing unit is connected to a data center via a communication module.

9. The system according to claim 8, wherein the data processing unit is configured to transmit a data set to the data center and/or to receive a data set from the data center, and wherein the data processing unit optimizes the object recognition based on received data sets.

10. A data center for managing data sets, wherein the data sets each comprise at least one image of a placement region of a load carrier and an ascertained number of articles, wherein the ascertained number of articles indicates a number of articles in the placement region, wherein the data center is connected, via a communication module, to a plurality of systems each for detecting the number of articles in the placement region of the load carrier in a warehouse in order to transfer data sets between, in each case, one system of the plurality of systems and the data center, wherein each system of the plurality of systems comprises an analysis region configured to receive the load carrier, an image capturing system for monitoring the analysis region, and a data processing unit, wherein the image capturing system is configured to capture an image of the placement region of the load carrier and to transmit the image to the data processing unit, wherein the data processing unit is configured to evaluate the image transmitted by the image capturing system using an algorithm for object recognition, in order to recognize the articles arranged in the placement region of the load carrier as objects and to ascertain the number of articles in the placement region of the load carrier, wherein the algorithm for object recognition is implemented in the data processing unit using machine learning based on a plurality of images that represent the placement region of the load carrier with different number of articles, wherein the images are provided to the data processing unit, and wherein each one of the plurality of images is linked to the number of articles corresponding to the respective image.

11. The data center according to claim 10, wherein an algorithm for machine learning different from the algorithm for object recognition is implemented in the data center, and wherein the algorithm for object recognition is improvable by providing data sets obtained from the algorithm for machine learning to the algorithm for object recognition.

12. A warehouse system comprising:

a plurality of load carriers, each with a placement region, a conveying device for transporting the load carriers, and a system for detecting a number of articles in the placement region of one of the load carriers, the system comprising:

an analysis region configured to receive one of the load carriers, an image capturing system for monitoring the analysis region, and a data processing unit, wherein the image capturing system is configured to capture an image of the placement region of the one of the load carriers and to transmit the image to the data processing unit, wherein the data processing unit is configured to evaluate the image transmitted by the image capturing system using an algorithm for object recognition, in order to recognize the articles arranged in the placement region of the one of the load carriers as objects and to ascertain the number of articles in the placement region of the one of the load carriers, wherein the algorithm for object recognition is implemented in the data processing unit using machine learning based on a plurality of images that represent the placement region of the one of the load carriers with different number of articles, wherein the images are provided to the data processing unit, and wherein each one of the plurality of images is linked to the number of articles corresponding to the respective image.

13. A method for detecting a number of articles in a placement region of a load carrier in a warehouse, the method comprising:

providing the load carrier in an analysis region, capturing an image of the placement region of the load carrier using the image capturing system and transmitting the image to a data processing unit, evaluating the image by the data processing unit using the algorithm for object recognition, recognizing articles arranged in the placement region as objects, ascertaining the number of articles, wherein the algorithm for object recognition is implemented in the data processing unit using machine learning based on a plurality of images that represent the placement region of the load carrier with different number of articles, wherein the images are provided to the data processing unit, wherein each one of the plurality of images is linked to the number of articles corresponding to the respective image, and conveying the load carrier away from the analysis region.

14. The method according to claim 13, wherein a transport specification for the load carrier is generated based on the ascertained number of articles, and wherein the load carrier is conveyed according to the transport specification.

15. The method according to claim 14, wherein the image is evaluated in real time, and wherein the transport specification is generated in real time.

16. The method according to claim 13, wherein the load carrier is moved through the analysis region at a constant speed, and wherein the image is captured during the movement of the load carrier through the analysis region.

17. The method according to claim 13, further comprising:

comparing the number of articles to a target value, transporting the load carrier to a working station when the target value is undershot or exceeded or transporting the load carrier to a storage location or an article issue when the number of articles matches the target value.

18. The method according to claim 17, further comprising:

directing, in case of a deviation of the ascertained number of articles from the target value, an input prompt to a user, recording a number of articles manually counted by the user, and providing the number of articles manually counted by the user to the data processing unit, whereupon the ascertained number of articles is compared to the manually counted number of articles by the data processing unit, and the algorithm for object recognition is adapted based on the comparison.

19. The method according to claim 13, further comprising:

measuring total weight of the load carrier by a weighing device to obtain a total weight value and transmitting the total weight value to the data processing unit, and calculating the number of articles in the placement region of the load carrier from a known individual weight of the articles and a known tare weight of the load carrier taken into account in the detection of the number of articles.

20. The method according to claim 13, wherein the algorithm for object recognition is optimized in a teaching step using machine learning based on existing article data and/or stored images of placement regions of load carriers, wherein a plurality of images of placement regions or a plurality of images of placement regions and numbers of articles corresponding to the images are provided to a computing unit having implemented on the computing unit the algorithm for object recognition, whereupon during a performed test run, a plurality of images of placement regions are provided to the computing unit, and the corresponding number of articles is ascertained by the computing unit using the algorithm for object recognition.

21. The method according to claim 13, wherein the object recognition of the data processing unit is optimized during ongoing operation using machine learning based on centrally stored images and numbers of articles corresponding to the images.

* * * * *